W. F. LENT.
GREASE CUP.
APPLICATION FILED MAR. 1, 1919.

1,328,573.

Patented Jan. 20, 1920.

Inventor;
Wilmar F. Lent,
by Palmer Palmer,
Attys.

UNITED STATES PATENT OFFICE.

WILMAR F. LENT, OF NEW HAVEN, CONNECTICUT, ASSIGNOR TO THE GREIST MANUFACTURING COMPANY, A CORPORATION OF CONNECTICUT.

GREASE-CUP.

1,328,573.   Specification of Letters Patent.   Patented Jan. 20, 1920.

Application filed March 1, 1919. Serial No. 280,034.

*To all whom it may concern:*

Be it known that I, WILMAR F. LENT, a citizen of the United States, residing at New Haven, in the county of New Haven and State of Connecticut, have invented or discovered certain new and useful Improvements in Grease-Cups, of which the following is a specification, reference being had therein to the accompanying drawing.

This invention relates to grease cups adapted to hold a soft or semi-liquid lubricant which is forced out by a piston or plunger, and the invention has for its object to provide a grease cup, of the class referred to, which is of such construction that the piston or follower may be screw operated in the usual manner to force out the lubricant; or, by proper adjustment, the stem of the piston may be disengaged from the screw threads of the nut or nuts through which it passes and may then be quickly operated, either for the purpose of returning the piston to its initial position or for the purpose of quickly forcing out the lubricant. Thus when the stem of the piston is disengaged, and the piston is thus free to be operated quickly by hand, the device is adapted to serve as a "grease gun" to quickly fill up a bearing to be lubricated, after which the parts may be adjusted so that the screw-threaded stem of the piston may be operated in its usual manner to feed the lubricant to the bearing to be lubricated. The present invention is shown as being applied to the form of grease cup shown and described in my application, No. 268,934, filed Dec. 30, 1918, but it will be understood that the invention may be applied to other forms of grease cups comprising screw-operated pistons or plungers.

Figure 1:
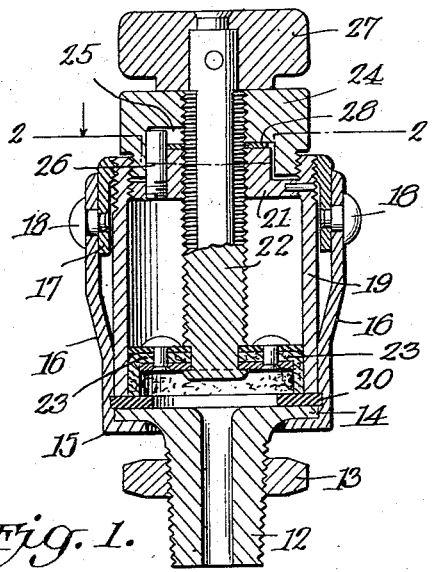
Figure 2:
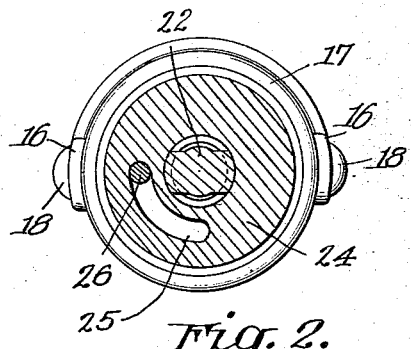
Figure 4:
Figure 3:
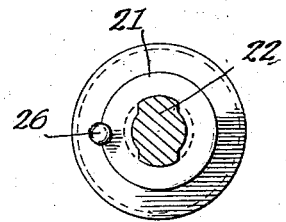

In the accompanying drawing Figure 1 is a central sectional view of the improved grease cup. Fig. 2 is a cross section of the same on line 2—2, Fig. 1. Fig. 3 is a detail plan view of the fixed nut, showing also the piston stem in section, and Fig. 4 is a cross section of the screw-threaded piston stem.

Referring to the drawing, 12 denotes a hollow threaded nipple adapted to be screwed into a bearing and which is provided with a lock nut 13 for retaining the same in place. The nipple 12 has a flanged portion 14 which is attached in any suitable manner to a base 15 of a frame part comprising upwardly extending arms 16 at the upper portion of which is an internally threaded sleeve or collar 17 pivotally connected to the said arm 16 by pins or rivets 18. The hollow grease receptacle or holder 19 is cylindrical in form and has a screw-threaded upper or outer end portion engaging the internally threaded sleeve or collar 17 so that it may be screwed up and down in said sleeve or collar for the purpose set forth in my said application No. 268,934. A packing washer 20 is preferably interposed between the lower end of the said receptacle or holder 19 and the flange 14 of the nipple 12.

Fixed to the upper part of the receptacle or holder 19, so that it cannot rotate within said receptacle or holder, is a nut 21 through which the threaded shank or stem 22 of the piston or follower 23 extends; and above the said nut 21 is a second nut 24 through which the said screw-threaded shank or stem also extends. The nut 24 engages with screw threads on the inside of the upper portion of the receptacle or holder 19, said threads having the same pitch as the threads on the nut, and the said nut 24 is provided on its under side with a segmental recess 25 of about 90° extent. Fixed to the nut 21 is a stop pin or screw 26 the upper end of which extends into the said segmental recess in such position that when said nut 24 is given a quarter turn in either direction the sad stop pin or screw will engage one of the opposite end walls of said segmental recesses.

The screw threads on the piston shank or stem 22 are relieved or cut away on opposite sides, as are also the threads on the opposite sides of the holes in the nuts 21 and 24. When the nut 24 is turned so that its relieved thread portions register with the relieved threaded portions of the nut 21, and the piston stem or shank 22 is turned to bring its threaded portions into register with the relieved portions of the said nuts, the said piston shank or stem will be disengaged from the threaded portions of both nuts and will then be free to be moved up or down quickly by the handle 27 fixed to the upper portion of said shank or stem; but when the nut 24 is turned to bring its relieved thread portions out of register with the relieved thread portions of the nut 21 the threaded stem or shank of the piston will be engaged with the threads of said nuts so that said stem or shank may be screwed down in the usual manner to force the lubricant out of the receptacle or holder 19. Thus when it is desired to return the piston 23 quickly to the top of the receptacle or holder 19, when said receptacle or holder is to be filled with lubricant, the nut 24 will be given a quarter turn for the purpose of bringing the relieved or cut-away parts of its screw threads into register with the relieved or cut-away thread parts of the nut 21; and if the bearing to be lubricated has not been filled with lubricant the said piston may be moved down quickly by its handle, and thus the device will act as a "grease gun" to fill up the bearing quickly with lubricant.

To prevent accidental displacement of the nut 24 when it has been turned to either of the positions above referred to, a spring washer 28 will preferably be interposed between said nut 24 and the top of the nut 21.

From the foregoing it will be understood that the piston of the grease cup may be quickly returned to a proper position in the receptacle or holder 19 to be filled, and it will also be understood that, when desired, the said piston may be operated quickly to force the lubricant into a bearing when it is desired to do this more rapidly than could be effected by the usual screw adjustment of the said piston.

The invention is not to be understood as being limited to the details of construction and arrangement shown and described, as such details may be varied widely, within the limits of mechanical skill, without departing from the spirit and scope of the invention.

Having thus described my invention I claim and desire to secure by Letters Patent:

1. In a grease cup, the combination with a receptacle or holder, of a follower fitting said receptacle or holder and provided with a screw-threaded shank or stem having relieved or cut-away portions, of means coöperating with said screw-threaded shank whereby said follower may be caused to travel by a screw adjustment in said receptacle or holder, or whereby said shank or stem may be disengaged so that said follower may be moved manually quickly in said receptacle or holder, said means comprising two threaded parts, one fixed and the other adjustable, said threaded parts having relieved or cut-away internal threaded portions which may be adjusted into or out of register with each other.

2. In a grease cup, the combination with a receptacle or holder, of a follower fitting said receptacle or holder and provided with a screw threaded shank or stem having relieved or cut-away portions, of means coöperating with said screw-threaded shank whereby said follower may be caused to travel by a screw adjustment in said receptacle or holder, or whereby said shank or stem may be disengaged so that said follower may be moved manually quickly in said receptacle or holder, said means comprising two nuts, one fixed and the other adjustable, said nuts having relieved or cut-away internal threaded portions which may be brought into or out of register with each other, and a stop for limiting the turning movement of said adjustable nut.

3. In a grease cup, the combination with a receptacle or holder, of a follower fitting said receptacle or holder and provided with a screw-threaded shank or stem having relieved or cut-away portions, of means coöperating with said screw-threaded shank or stem whereby said follower may be caused to travel by a screw adjustment in said receptacle or holder, or whereby said shank or stem may be disengaged so that said follower may be moved manually quickly in said receptacle or holder, said means comprising two nuts, one fixed and the other adjustable, said nuts having relieved or cut-away internal threaded portions which may be brought into or out of register with each other, one of said nuts having a segmental recess, and a fixed stop device extending into said recess in proper position to be engaged by the end walls thereof.

4. In a grease cup, the combination with a receptacle or holder, of a follower fitting said receptacle or holder and provided with a screw-threaded shank or stem having relieved or cut-away portions, of means coöperating with said screw-threaded shank or stem whereby said follower may be caused to travel by a screw adjustment in said receptacle or holder, or whereby said shank or stem may be disengaged so that said follower may be moved manually quickly in said receptacle or holder, said means comprising two nuts, one fixed and the other adjustable, said nuts having relieved or cut-away internal threaded portions which may be brought into or out of register with each other, and a spring friction washer for preventing accidental turning movement of said adjustable nut.

In testimony whereof I affix my signature.

WILMAR F. LENT.